United States Patent

[11] 3,625,833

[72] Inventor James J. Schaffer
717 West First St., P.O. Box 1015,
Bloomington, Ind. 47401
[21] Appl. No. 5,366
[22] Filed Jan. 23, 1970
[45] Patented Dec. 7, 1971

[54] PROCESS FOR PRODUCING ANTIVIRAL SUBSTANCE FROM STAPHYLOCOCCUS ORGANISMS
7 Claims, No Drawings

[52] U.S. Cl. ..................................................... 195/96,
195/100
[51] Int. Cl. ....................................................... C12d 9/20
[50] Field of Search ........................................... 195/96, 80

[56] References Cited
UNITED STATES PATENTS
3,303,094 2/1967 Sokoloff et al. .............. 195/80
3,398,056 8/1968 Zygmunt et al. .............. 195/96

OTHER REFERENCES

Proc. Soc. Exp. Biol. & Med., Vol. 119, No. 4, pps. 1176–1181 (1965)

Primary Examiner—Alvin E. Tanenholtz
Attorney—Dawson, Tilton, Fallon & Lungmus

ABSTRACT: Staphylococcus bacteria are cultured to produce an antiviral substance having inhibitory activity against Coxsacki B virus, Semliki-Forest virus, and the like. For use in the process, a nonpathogenic strain of staphylococcus bacteria is selected, the strain being classifiable as *Staphylococcus albus* or *Staphylococcus aureus* (albus variant). The strain is propagated in a culture medium containing a growth-promoting concentration of aspartic acid, preferably DL aspartic acid. The antiviral substance which can be recovered from the broth has utility in treating viral infections of animals, including transmissible gastroenteritis (TGE) in swine and distemper in dogs and cats.

PROCESS FOR PRODUCING ANTIVIRAL SUBSTANCE FROM STAPHYLOCOCCUS ORGANISMS

BACKGROUND AND SUMMARY

It is known that staphylococci when cultured in vitro produce an antiviral substance having an inhibitory activity against certain viruses either in vivo with laboratory animals or in tissue culture, where the virus has been adapted for such culture. Gresser et al. reported that the antiviral substance inhibited Sindbis, Western equine encephalitis, and West Nile viruses. *Proc. Soc. Exp. Biol. & Med.*, Vol. 119, pp. 1176–1181, (1965). Schaffer et al. reported inhibitory observations for a nonpathogenic strain of an *albus* variant of *Staphylococcus aureus* in suckling mice subjected to lethal infections with Coxsackie B. *Proc. Soc. Exp. Biol. & Med.*, Vol. 112, pp. 561–564, (1965). The presently known spectrum includes the enteroviruses (Polio I, II, III, Coxsackie B virus, Coxsackie A-9 and Echo Virus 9); Herpes virus, Reo, HGP and the CNS virus (Semliki-Forest). Some effect has been demonstrated against Adenovirus and Newcastle disease virus.

As reported in the above-cited paper of Gresser et al. the staphylococcus organism (which is stated to possess characteristics of both a *Staphylococcus albus* and a *Staphylococcus aureus*) was cultured on a beef heart infusion broth, and the bacterial mass was separated from the broth by centrifugation. The broth was found to contain only slight amounts of the antiviral substance. The bacterial sediment was then disintegrated by sonic vibration mechanical disruption. Additional quantities of the antiviral substance were thereby liberated into the water in which the disintegrated bacteria was suspended.

The present invention provides a practical, safe, and efficient method for preparing the previously reported antiviral substance from staphylococcus bacteria. The safety of the process is assured by using a nonpathogenic strain of staphylococcus and by propagating the strain under conditions where it remains nonhemolytic. The growth of the staphylococci are promoted by incorporating aspartic acid into the culture medium. Even more importantly, the use of aspartic acid markedly enhances the production of the antiviral substance, which is elaborated by the organisms directly into the culture broth. This permits the bacteria cells to be separated intact from the broth, and the antiviral substance recovered from the cell-free broth.

DETAILED DESCRIPTION

In practicing the present invention, it is important to utilize a nonpathogenic strain of staphylococcus bacteria. Such an organism will be classifiable by standard classification procedures, (see Wilson and Miles *Principles of Bacteriology and Immunology*, 5th Ed. 1964) as a strain of *Staphylococcus albus* or *Staphylococcus aureus* (*albus* variant). Under the culture conditions utilizable in the process of this invention, the selected organism should not produce any observable color (pigment), and therefore, it is acceptable to refer to the organism as *Staphylococcus albus*, although under some conditions the organism might revert or convert to a color-producing form, and might be classifiable as a strain of *Staphylococcus aureus*.

Whereas the available evidence indicates that all *Staphylococcus albus* strains are capable of producing an antiviral substance, and that this substance can be generally characterized as having inhibitory activity against certain standard laboratory test viruses; namely, Coxsacki B virus and/or Semliki-Forest virus. As is well known in the art, both of these viruses can be propagated for test purposes in laboratory animals such as mice. For purposes of screening *Staphylococcus albus* organisms for antiviral activity, The Coxsacki B virus is convenient, since it has been adapted to in vitro tissue culture, and the integration can thereby be observed in vitro. Literature citations indicating procedures for growing these viruses for test purposes are:

Smithburn, K.C., and Haddow, A.J., Semliki-Forest Virus, I. Isolation and Pathogenic Properties, J. Immunol. 49, 141–157; and Melnick, J.L., and Ledinko, N., 1950, Immunological Reactions of the Coxsacki Viruses, I. The Neutralization Test: Technique and Application, J. Exp. Med. 92, 463–482.

Standard tests for classifying staphylococcus bacteria as pathogenic nonpathogenic are also well known in the art. For the purposes of the present invention, the *Staphylococcus albus* strain employed should be characterized as nonhemolytic, coagulase-negative, mannite-negative, and penicillin-sensitive. The procedures for conducting these tests are described in:

Wilson, G.C., Miles, A.A., Topley and Wilson Principles of Bacteriology and Immunology, 5th Edition, Williams & Williams Co., 1964.

The nonpathogenic, *Staphylococcus albus* strain is propagated in an aqueous culture medium, which may consist of water with the essential nutrients for the bacteria. Various culture broths or mediums can be used. Trypticase Soya broth (BBL broth) has been found to be advantageous. This culture medium in dry form is manufactured and sold by the Baltimore Biological Laboratories, Baltimore, Md. A typical analysis of the BBL broth as used is:

| Ingredient | gms./l. |
| --- | --- |
| Trypticase (pancreatic digest of casein) | 17.0 |
| Phytone (soy peptone) | 3.0 |
| SOdium Chloride | 5.0 |
| Dipotassium Phosphate | 2.5 |
| Dextrose | 2.5 |
| Distilled Water | 9.5 |

While the concentration of the nutrients in the aqueous medium or broth is not usually critical, the solids concentration will usually be less than 50 grams per liter. For example, the Trypticase Soya (BBL) product can be dissolved in distilled water at a concentration of about 15 to 30 grams per liter to form a broth adapted for growing or propagating the *Staphylococcus albus* bacteria in accordance with the present invention.

If the organism being propagated is not a true *allus*, but rather an albus variant of a *Staphylococcus aureus*, it may be subject to reversion or conversion to a bacterial form producing pigment or color. In some cases, this could indicate that the organism is pathogenic and not suitable for use in the present invention. However, the progress of the propagation can be followed by making periodic samplings of the bacteria and determining that the bacteria are still nonhemolytic according to the test procedures cited above. This will confirm that the culturing is not changing the essential characteristics of the organism, and that they are continuing to reproduce as a true strain. As is well known in the art, extremely rich or concentrated broths or culture mediums, such as those derived from animals (viz. horse serum), may have a tendency to cause *albus* variant staphylococci to revert or convert to the aureus form, as indicated by the presence of pigment or color in the medium containing the growing bacteria. For the purposes of the present invention, this is not a serious problem, since it is relatively easy to propagate the selected strain of bacteria and maintaining the strain as nonhemolytic, and this simple test can function as a satisfactory control on the process.

To achieve the benefits of the present invention, namely the enhancement of the production of the antiviral substance and its elaboration external to the bacterial cells, it is important to incorporate a small amount of aspartic acid in the culture medium. Aspartic acid (amino succinic acid) is commercially available as a LD racemic mixture. L-aspartic acid is also available commercially, but is considerably more expensive than the racemic mixture. The D-form is usually not sold commercially, since when dissolved in water it reverts to the LD mixture. FOr the purpose of the present invention, either the L,D mixture can be used or the L-form. While L- and D-aspartic acid are only slightly soluble in water, they can be dissolved at the concentrations desirable for use in the present invention. They may therefore be incorporated in the culture medium by dissolving therein, and will be present as free acids in contact with the multiplying bacteria. The mechanism of action of aspartic acid is not understood, but there is evidence indicating that it functions as a growth promotant, increasing the rate of growth of the bacteria and resulting in a larger bacterial mass. However, is is believed that this is not the only effect, since it has been discovered that the antiviral substance is produced in much greater yields, and it therefore appears that the aspartic acid functions as an adjuvant for the elaboration of the antiviral substance. Particularly noteworthy is the fact that the antiviral substance is elaborated into the water of the culture medium, permitting the propagating to be continued until the culture medium contains a recoverable quantity of the antiviral substance. In general, the culturing conditions, such as temperature, will be those which are known in the art as favoring the growth of staphylococcus organisms. The improved results of the present invention therefore depend on the presence of a sufficient amount of aspartic acid in the culture medium to promote the growth rate of the bacteria and/or promote the formation and liberation into the broth of the antiviral substance. Where the aspartic acid is used in its DL-form, the culture medium preferably contains from about 8 to 25 grams of the racemic mixture per liter of the culture medium. More generally, the culture medium can advantageously contain at least 5 grams per liter of the DL mixture of aspartic acid, but usually it will not be desirable to employ more than 30 grams per liter. Although the L-form of aspartic acid is a more expensive reagent than the racemic mixture, there is evidence that L-aspartic acid has a higher potency per gram as a growth promotant and/or adjuvant. In some cases, therefore, it may be possible to employ as little as 2.5 grams per liter of L-aspartic acid, and it is believed it will not usually be necessary to employ more than about 15 grams per liter of the culture medium.

After completion of the filtering of the bacteria under the conditions previously described, the water phase will contain the antiviral substance. While various recovery procedures can be used, it is desirable to first separate the bacteria by centrifugation or filtration, leaving a clear, cell-free supernatant containing the inhibitory activity. The antiviral substance can be precipitated with alcohols or ketones, such as ethanol or acetone. Precipitation with 90 percent ethanol and purification thereby is disclosed in the above-cited article of Gresser et al. Another usable procedure is to add acetone to the separated broth to cause the antiviral to precipitate. Since the antiviral substance loses activity under strong acid or alkaline conditions, it will usually be desirable to carry out the precipitation at a neutral or slightly basic pH. While pH's within the range from 6.5 to 8.5 can be used, the preferred pH is about 7 to 7.5. When necessary, the pH can be adjusted toward neutral or slightly alkaline by adding reagents such as sodium bicarbonate. The precipitated material containing the antiviral substance can then easily be recovered by centrifugation or filtration. It can be further purified by washing with alcohols or acetone. For resolution, a glucose-carbonate buffer solution can be used, the precipitate being soluble up to at least 1 gram per 10 ml. The redissolved antiviral substance can then be stored or used as required. Refrigerated storage temperatures of 35° to 50° F. are desirable to minimize loss of activity.

It will be apparent that the antiviral substance prepared by the method of this invention will have veterinary and medical uses, as well as research uses. Of great value is the discovery that the antiviral substance inhibits the TGE virus, which causes the disease of transmissible gastroenteritis in swine. Antiviral substance produced by the method of this invention has been found to be effective in improving the survival of baby pigs infected with TGE. Also, antiviral substance produced by the method of this invention is found to be effective in improving the survival rate of dogs and cats infected with distemper.

It will be understood that many of the details set forth herein are intended to be illustrative and not limiting. The invention is further illustrated by the following examples.

EXAMPLE I.

The incubation media is prepared by the addition of 75 grams of trysticase soya agar and 25 grams of L- or DL-aspartic acid in 2,000 cc. of distilled water, and mixture is sterilized by autoclaving at 256° for 30 minutes. An innoculum of 0.1 ml. of stock *Staphylococcus albus* is added to the incubation flask using aseptic technique. Incubation temperature of 35.5°–37° C. under aerobic conditions is maintained for 106–120 hours. Stationary incubation appears as efficient as "shaker" cultures. Ph of media is maintained at approximately ph 3.5–4.0 by the addition of $NaHCO_3$. Incubation mixture is cooled to 4° C., and separation of bacteria from broth accomplished by filtration and/or centrifugation at 4° C. at 12,000 r.p.m. for 30–45 minutes. The supernatant fluid so obtained is mixed with cold acetone in equal volume and further clarified by washings in cold acetone. Approximately 25– 35 mg. active complex substance per liter of broth is recovered. 250 mg. of substance is dissolved in 250 cc. of glucose-carbonate solution with a final pH of 7.6–7.9. Final concentration of the glucose-carbonate solution is 10 percent glucose with approximately 105 millequivalents of $NaHCO_3$. The mixture so constituted is stable at refrigerator temperature for 5–7 days and room temperature for 3 days. Potency of the original substance is maintained at −4° C. submerged in pure acetone. The life of the active principle in the complex substance is also maintained by lyophilozation using standard techniques.

EXAMPLE II.

Biologic activity, e.g., antiviral inhibitory activity of the staphylococcal extract (substance) is enhanced by the addition of aspartic acid to the incubation media consisting of trysticase soya agar in distilled water. Either L or DL forms of aspartic acid is employed. No significant difference between the isomers was demonstrated if present in the same concentration as the DL form in the incubation media. A 15-fold increase in the protective activity against Semliki-Forest Virus (SFV) was demonstrated in weanling white mice by the addition of aspartic acid to the growth media. No increase in toxicity of the substance was observed. The maximal protective dose for weanling white mice against SFV derived in growth media devoid of aspartic acid and prepared as described in example I was 100 $LD_{50}$/ml. of constituted solution. The addition of aspartic acid in a concentration of 8–18 g. per liter of growth media enhanced protective activity 15 fold, as previously described. Similar results were obtained with a substance from a hospital strain of nonhemolytic, penicillin-sensitive, staphylococcal albus despite a lesser initial protective effect in the growth media devoid of aspartic acid. Studies with two strains of hemolytic, coagulase- and mannite-positive, staphylococci in a similar experimental model show little if any initial protective activity from substance derived from the plain growth media, and no enhanced effect was observed by the addition of aspartic acid. In fact, systemic toxicity, e.g. probable endotoxic response, was enhanced in the control mice.

EXAMPLE III.

The identification and maintenance of the index organism (*Staphylococcus albus*) is carried out by frequent assay and the use of various biochemical reactions as outlined in Wilson and Miles Principles of Bacteriology and Immunology, 5th Ed. 1964. The Index strain of *staphylococcus albus* is a strain of nonhemolytic *staphylococcus albus* showing sensitivity to penicillin and other common antibiotics, and is mannite- and coagulas-negative. No liquefaction of gelatin is observed.

EXAMPLE IV.

Transmissable Gastroenteritis of Swine TGE is a virus disease of swine characterized by a high mortality and morbidity, particularly in newborn pigs. In a recent study, newborn pigs inoculated with the virus inhibitory substance derived form a nonpathogenic strain of *staphylococcus albus* (as described in examples I and III) survived in numbers varying between 65–75 percent of the total farrowing in an infected herd. A comparable study with an antiviral polysaccharide substance derived form a "mold" source revealed a survival rate of 20 percent. Control animals demonstrated a survival rate of 2–5 percent.

Treatment of the baby pigs consists of 5 cc. of inhibitory substance, as prepared in example II, inoculated intraperitonealy daily for the initial 3 days of life. The potency of the compound in the study was determined by simultaneous assay in weanling white mice against Semliki-Forest Virus. One milliliter (1 ml.) of the "antiviral" preparation protected 15–20 gram mice against 1500 lethal dose of SFV.

EXAMPLE V.

Preliminary study with the substance as derived in examples I–II demonstrates inhibitory activity against distemper virus in dogs and cats. Six medium-size dogs, 20–35 pounds in weight, naturally infected with distemper virus were inoculated intravenously with 5 cc. of the inhibitory substance for 3 consecutive days. The recovery of the animals was prompt and complete without sequelae. A similar observation was made in two cats naturally infected with distemper virus and isolated in a University experimental laboratory. The recovery of the animals was prompt and complete as observed in the dogs.

I claim:

1. In the process of culturing of viable staphylococcus bacteria to produce an antiviral substance having inhibitory activity against Coxsacki B virus, Semliki-Forest virus, and the like the process steps of:
   a. selecting a nonpathogenic strain of staphylococcus bacteria producing said substance, said staphylococcus being classifiable as *Staphylococcus albus* or *Staphylococcus aureus* (albus variant), and being further characterized as nonhemolytic, coagulose-negative, mannite-negative, and penicillin-sensitive; and
   b. propagating said strain in an aqueous culture medium in the presence of a growth-promoting concentration of aspartic acid while said strain remains nonhemolytic, until said culture medium external to the bacteria cells therein contains a recoverable quantity of said substance.

2. The process steps of claim 1 where said aspartic acid is added to said culture medium as a mixture of its D- and L- forms.

3. The process steps of claim 1 in which said aspartic acid is primarily in the form of L-aspartic acid.

4. The process steps of claim 1 where said aspartic acid is in the form of a D-, L-racemic mixture thereof and is employed at a concentration within the range from about 8 to 25 grams of said racemic mixture per liter of said culture medium.

5. In the process of culturing of viable staphylococcus bacteria to produce an antiviral substance having inhibitory activity against Coxsacki B virus, Semliki-Forest virus, and the like, the process steps of:
   a. selecting a nonpathogenic strain of staphylococcus bacteria producing said substance, said staphylococcus being classifiable as *Staphylococcus albus* or *Staphylococcus aureus* (albus variant), and being further characterized as nonhemolytic, coagulose-negative, mennite-negative, and penicillin-sensitive;
   b. preparing an aqueous culture medium for said staphylococcus bacteria and incorporating therein from 5 to 30 grams per liter of a D-, L-mixture of aspartic acid; and
   c. propagating said staphylococcus bacteria in said aspartic acid-containing culture medium to produce said substance in enhanced quantities.

6. The process steps of claim 5 in which said aspartic acid is employed at a concentration of about 8–25 grams per liter.

7. In the process of culturing of viable staphylococcus bacteria to produce an antiviral substance having inhibitory activity against Coxsacki B virus, Semliki-Forest virus, and the like, the process steps of:
   a. selecting a nonpathogenic strain of staphylococcus bacteria producing said substance, said staphylococcus being classifiable as *Staphylococcus albus* or *Staphylococcus aureus* (albus variant) and being further characterized as nonhemolytic, coagulose-negative, mannite-negative and penicillin-sensitive;
   b. preparing an aqueous culture medium for said staphylococcus bacteria and incorporating therein from about 2.5 to 15 grams per liter of L-aspartic acid; and
   c. propagating said staphylococcus bacteria in said aspartic acid-containing culture medium to produce said substance in enhanced quantities.

* * * * *